United States Patent [19]

Vaughan

[11] Patent Number: 4,879,103
[45] Date of Patent: Nov. 7, 1989

[54] COMPOSITION AND PROCESS FOR PREPARING ECR-30

[75] Inventor: David E. W. Vaughan, Flemington, N.J.

[73] Assignee: Exxon Research and Engineering Company, Florham Park, N.J.

[21] Appl. No.: 249,754

[22] Filed: Sep. 27, 1988

Related U.S. Application Data

[63] Continuation-in-part of Ser. No. 118,301, Nov. 6, 1987, abandoned, which is a continuation-in-part of Ser. No. 606,940, May 4, 1984, Pat. No. 4,714,601.

[51] Int. Cl.[4] ............................................. C01B 33/28
[52] U.S. Cl. .................................... 423/329; 423/328
[58] Field of Search ............... 423/328, 329, 330, 331, 423/332, 333, 334; 502/60, 64, 62, 77

[56] References Cited

U.S. PATENT DOCUMENTS

| | | | |
|---|---|---|---|
| 3,415,736 | 12/1968 | Ciric | 423/328 |
| 3,972,983 | 8/1976 | Ciric | 423/328 |
| 4,333,859 | 6/1982 | Vaughan et al. | 423/328 |
| 4,714,601 | 12/1987 | Vaughan | 423/329 |

OTHER PUBLICATIONS

Kokotailo et al., "Synthesis and Structural Features of Zeolite ZSM-3" Molecular Sieves-I, American Chemical Society, Wash., D.C. (1971) pp. 109-121.

*Primary Examiner*—John Doll
*Assistant Examiner*—R. Bruce Breneman
*Attorney, Agent, or Firm*—Ronald D. Hantman

[57] ABSTRACT

A zeolite characterized by having an x-ray diffraction pattern as shown in Table 1, a silica to alumina mole ratio of at least six, and containing triethyl methyl ammonium, wherein said organic ammonium templates are within the super cages of said aluminosilicate, said zeolite having a hexagonal unit cell.

9 Claims, 4 Drawing Sheets

COMPARISON OF CONNECTIVITY IN CUBIC PACKED (CP) AND HEXAGONAL PACKED (HP) SODALITE CAGES.

CP STACKED
FAUJASITE

HP STACKED
ECR-30

COMPARISON OF CONNECTIVITY IN CUBIC PACKED (CP) AND HEXAGONAL PACKED (HP) SODALITE CAGES.

HP STACKED ECR-30

CP STACKED FAUJASITE

COMPOSITION AND PROCESS FOR PREPARING ECR-30

This application is a continuation-in-part of U.S. Ser. No. 118301, filed Nov. 16, 1987, now abandoned, which is a continuation-in-part of U.S. Ser. No. 606,940, filed May 4, 1984, now U.S. Pat. No. 4,714,601.

FIELD OF THE INVENTION

The present invention relates to a high silica polymorph, designated as ECR-30, having a novel large pore structure and containing the organic ions methyl triethyl ammonium. It also relates to a process for preparation of the zeolite. It may be employed in catalytic, absorbent or separation applications, particularly in cracking and hydrocracking catalysts. It may further comprise an intergrowth structure comprising sheets or blocks of the "Breck 6" alternating with blocks or strips of the faujasite structure (see claim 9).

BACKGROUND OF THE INVENTION

Zeolites with high silica to alumina ratios, i.e., of at least six, are desirable because of their particular catalytic selectivity and their thermal stability; the latter is a property particularly important when the zeolite is used as catalyst or in adsorption procedures wherein exposure to high temperatures would be expected.

The use of quaternary ammonium salts as templates or reaction modifiers in the preparation of synthetic crystalline aluminosilicates (zeolites), first discovered by R. M. Barrer in 1961, has led to preparation of zeolites with high silica to alumina ratios which are not found in nature. For example, U.S. Pat. No. 4,086,859 discloses preparation of a crystalline zeolite thought to have the ferrierite structure (ZSM-21) using a hydroxyethyl-trimethyl sodium aluminosilicate gel. A review provided by Barrer in *Zeolites*, Vol. I, p. 136 (October, 1981) shows the zeolite types which are obtained using various ammonium organic bases as cation. In addition, Breck, *Zeolite Molecular Sieves*, John Wiley (New York, 1974), pp. 348-378, provides a basic review of zeolites obtained using such ammonium cations in the synthesis thereof, as does a review by Lok et al. (Zeolites, 3, p. 282, (1983)).

The use of tetramethyl ammonium cations (TMA) in the synthesis of zeolites A, Y and ZSM-4 (mazzite) is known, e.g., U.S. Pat. Nos. 3,306,922; 3,642,434; 4,241,036 and 3,923,639. In all these cases, the TMA is trapped in the smaller cavities in the structures (sodalite or gmelinite cages), and must be burned out at high temperatures, often leading to lattice disruption and collapse. In most of these syntheses, the $SiO_2/Al_2O_3$ ratio of the zeolites is less than about 6.

It is also known that even minor changes in the size or charge distribution of these large organic cations can induce the formation of different zeolite structures. U.S. Pat. No. 4,046,859 teaches that replacement of one of the methyl groups of the TMA compound with a hydroxy ethyl group causes the formation of a ferrierite-like phase (ZSM-21). Many such examples are enumerated by Barrer (Zeolites, 1981). The objective of the present invention is to develop preparation methods yielding new high silica large pore materials, where the organic templates are not locked into the small cavities in the structure, but are instead present in the large "super cages" from which they can be readily removed without disruption and degradation of the host lattice.

It is a further objective of this invention to prepare materials having the basic faujasite building block (sheets of interconnected sodalite cages) linked in different ways so as to form new materials having large pores and internal free volumes. In a discussion of possible theoretical and actual structures based on interlinked trunkated cubooctahedra (sodalite cages), Moore and Smith (Mineralogical Magazine, 33, p. 1009, (1963)) showed a known zeolite built from connected sheets of linked sodalite cages in an ABCABC stacking sequence (i.e. faujasite), together with a purely theoretical structure of ABAB stacked similar sheets (this has become known as "Breck 6" by some researchers after a similar tabulation by Breck ("Zeolite Molecular Sieves", by D. W. Breck, J. Wiley and Sons, p. 58 (1973)). The latter structure comprises a hexagonal unit cell having approximate dimensions a=17.5 Å and c=28.5 Å. These two forms may also be viewed as being analogous to cubic (cp) and hexagonally (hp) packed sodalite cages.

As these materials comprise the same sheet only stacked in different ways, it is clear that the cp (faujasite) and hp ("Breck 6") forms may randomly intergrow to give a mixed structural composite. Said intergrowths are now well known in mineralogy, and in zeolite mineralogy in particular, thanks to the increasing use of high resolution lattice imaging electron microscopy (Millward et al., Proc. Roy. Soc., A 399, p. 57 (1985); Rao and Thomas, Accounts of Chem. Res., 18, p. 113 (1985)).

In the high silica form, the faujasite end member of this group has been described as ECR-4, and is made in the presence of several "unbalanced" alkyl ammonium template cations. The similar high silica hp form is the subject ECR-30, made in the presence of only one "unbalanced" template—vis, methyl triethylammonium. We have further discovered that, depending upon specific compositions of template and Si/Al ratios, intergrowths and mixtures of ECR-4 and ECR-30 may be synthesized and controlled. The differences in connectivity of sodalite cages in the prior art cp (faujasite, X, Y) and new hp (ECR-30) forms are clearly shown in FIG. 1.

In addition to the prior theoretical studies of the hp form, various other faujasite modifications have been discussed in the literature. One such material is CSZ-1 (U.S. Patent 4,309,313) made in the presence of cesium cations, and having an x-ray diffraction pattern which was originally tentatively indexed on a hexagonal unit cell. However, CSZ-1 was recently shown to comprise a lightly distorted faujasite structure containing a twin plane in very thin crystals (Treacy et al., J.C.S. Chem. Comm., p. 1211 (1986)). The twin creates enough strain in the faujasite lattice to cause a rhombohedral distortion (Treacy et al, in Proc. Electron Microscopy Workshop (Hawaii), San Francisco Press (1987)). A faujasite crystal with an individual double twin plane has also been observed (Thomas et al., J.C.S. Chem. Comm., p. 1221 (1981)). Other claimed faujasite like materials are ZSM-20 (U.S. Pat. No. 3,972,983) made with tetraethylammonium cations and ZSM-3 (U.S. Pat. No. 3,415,736) made with lithium and sodium. Although having a hexagonal like unit cell similar to CSZ-1 and ECR-30, the inventor of ZSM-3 could not establish a "c" axis dimension for a hexagonal cell (Kokotailo and Ciric, Molecular Sieves Zeolites-1, A.C.S. Adv. Chem. Ser. 101, Ed. Flanigen and Sand., p. 109 (1971)), and proposed that it may be a random stacking of faujasite (ABC) and "Breck 6" (AB) i.e., a random mixture of the cp and hp forms.

Recent re-evaluation of ZSM-20 by Derouane et al (Applied Cat., 28, p. 285, (1986)) and Ernst et al (Zeolites, 7, p. 180, (1987)) describe essentially the same material as being faujasite like, and comprising spherical aggregates of twinned chunky crystals, having a unit cell that can be indexed on a hexagonal unit cell. Our own analysis of ZSM-20 shows that it is an intergrown mixture of the cp and hp structures with significant intergrown crystals of the cp faujasite.

An analysis of the available data indicates that the structures and relationships between these various preparations of cp and hp stacking and sodalite cages linked through double six rings are as follows:

| Designation | Si/Al Range | Structure | U.S. Pat. No. |
|---|---|---|---|
| X | 1 to 1.5 | cp | 2882243 |
| Y | 1.5 to 3 | cp | 3130007 |
| ECR-4 | 3 to 10 | cp | pending |
| CSZ-1 | 1.5 to 3.5 | distorted cp | 43093313 |
| ZSM-3 | 1.4 to 2.25 | random mix cp + hp | 3415736 |
| ZSM-20 | 3.5 to ∞ | random mix cp + hp | 3972983 |
| ECR-30 | 3 to 10 | hp | pending |

Morphologically ZSM-3 and ZSM-20 are similar, in that they form crystals about $0.6\mu$ diameter and $0.2\mu$ thick and having a squashed octahdron shape that is almost hexagonal in outline, very similar to a twinned "platelet faujasite" (U.S. Pat No. 4175059). ECR-30 and CSZ-1 are also similar morphologically, and form thin plates up to $1\mu$ diameter and less than $0.05\mu$ thick, as shown in FIG. 3 (ECR-30) and Treacy et al (CSZ-1) (JCS Chem. Comm., p 1211, (1986)).

A theoretical x-ray diffraction pattern for the hp structure based on the space group $P6_3/mmc$ is shown in Table 1, assuming lattice constants of $a=17.3$ Å and $c=28.78$ Å, and excluding water and cations. The three strongest lines are the first three peaks, having an intensity relationship of $100>002>101$. As the 002 of the hp structure is coincident with the 110 of the cp structure, excessive intensity in this line, reflected in a relatively high 002/100 ratio, is indicative of contributions from the cp structure. An important defining characteristic of ECR-30 is therefore that this latter peak intensity ratio is minimum, and always lower than seen in mixed cp+hp structures like ZSM-3 and ZSM-20. Comparison of the intensity relationships in FIG. 2 with those for published spectra for ZSM-20 previously mentioned, clearly confirm this observation.

TABLE 1

THEORETICAL X-RAY DIFFRACTRION PATTERN FOR ECR-30 (hp STRUCTURE) FOR $CuK_a$ RADIATION

| 2θ | D | hkl | I/I$_O$ | +cp |
|---|---|---|---|---|
| 5.89 | 14.98 | 100 | 100 | |
| 6.14 | 14.39 | 002 | 43.2 | * |
| 6.65 | 13.29 | 101 | 30.7 | |
| 10.22 | 8.65 | 110 | 14.6 | |
| 10.98 | 8.079 | 103 | 22.0 | |
| 11.80 | 7.491 | 200 | 4.2 | * |
| 11.93 | 7.413 | 112 | 9.8 | |
| 12.20 | 7.249 | 201 | 1.3 | |
| 13.31 | 6.664 | 202 | 0.5 | |
| 13.64 | 6.486 | 104 | 2.1 | |
| 14.99 | 5.904 | 203 | 0.8 | |
| 15.64 | 5.662 | 210 | 8.0 | * |
| 15.94 | 5.556 | 211 | 4.5 | |
| 16.48 | 5.373 | 105 | 2.7 | |
| 16.81 | 5.269 | 212 | 1.0 | |
| 17.07 | 5.189 | 204 | 8.8 | |
| 18.18 | 4.876 | 213 | 2.2 | |
| 18.79 | 4.718 | 302 | 1.5 | |
| 19.41 | 4.568 | 106 | 0.9 | |
| 19.43 | 4.564 | 205 | 0.9 | |
| 19.94 | 4.450 | 214 | 0.9 | |
| 20.03 | 4.430 | 303 | 0.2 | |
| 20.52 | 4.325 | 220 | 5.0 | |
| 21.99 | 4.040 | 206 | 2.2 | |
| 22.00 | 4.037 | 215 | 1.1 | |
| 22.40 | 3.965 | 107 | 2.3 | |
| 23.74 | 3.745 | 400 | 1.8 | |
| 23.94 | 3.714 | 401 | 1.0 | |
| 24.54 | 3.625 | 402 | 0.3 | |
| 24.68 | 3.604 | 207 | 0.6 | |
| 24.72 | 3.598 | 314 | 2.1 | |
| 25.44 | 3.498 | 108 | 0.8 | |
| 25.51 | 3.489 | 403 | 0.2 | |
| 25.73 | 3.459 | 306 | 0.2 | |
| 25.90 | 3.437 | 320 | 0.8 | |
| 26.43 | 3.369 | 315 | 1.4 | |
| 26.64 | 3.343 | 322 | 0.3 | |
| 26.82 | 3.322 | 118 | 1.9 | |
| 27.25 | 3.269 | 410 | 1.8 | |
| 27.54 | 3.236 | 323 | 0.9 | |
| 28.09 | 3.174 | 307 | 0.4 | |
| 28.39 | 3.141 | 316 | 0.2 | |
| 28.76 | 3.101 | 324 | 1.7 | |
| 28.83 | 3.094 | 413 | 0.2 | |
| 29.39 | 3.027 | 218 | 0.2 | |
| 29.79 | 2.996 | 500 | 0.2 | |
| 29.96 | 2.980 | 501 | 0.2 | |
| 30.37 | 2.941 | 209 | 0.3 | |
| 30.45 | 2.933 | 502 | 0.3 | |
| 30.60 | 2.919 | 308 | 1.4 | |
| 30.99 | 2.883 | 330 | 1.3 | |
| 31.05 | 2.878 | 0010 | 1.9 | |
| 31.25 | 2.860 | 503 | 3.5 | |
| 31.62 | 2.287 | 1010 | 0.4 | |
| 32.01 | 2.794 | 326 | 0.3 | |
| 32.19 | 2.788 | 422 | 0.5 | |
| 32.34 | 2.766 | 504/228 | 1.7/1.0 | |

SUMMARY OF THE INVENTION

According to the present invention, a high silica crystalline polymorph (zeolite), designated for convenience herein as ECR-30, having the hp sodalite cage structure and a $SiO_2/Al_2O_3$ mole ratio of at least six can be readily prepared which contains organic templates of methyl triethyl within the large cages of the aluminosilicate. The chemical composition for this zeolite, expressed in terms of mole ratios of oxides, is in the range: 0.2 to 0.8 $T_2O$:0.2 to 0.8 $Na_2O$:$Al_2O_3$:6 to 20 $SiO_2$:$xH_2O$ wherein T represents an unbalanced organic template of methyl triethyl ammonium, and x represents 0 or an integer from 1 to 25, depending on composition and degree of hydration. A more preferred composition for the zeolite is in the range: 0.2 to 0.6 $T_2O$:0.20 to 0.8 $Na_2O$:$Al_2O_3$:6 to 15 $SiO_2$:$xH_2O$. A most preferred composition for the zeolite is in the range: 0.2 to 0.6 $T_2O$:0.4 to 0.8 $Na_2O$: $Al_2O_3$:6 to 12 5:$SiO_2$.

The aluminosilicate herein may be used as a sorbent or as a catalyst, e.g., as a hydrocarbon conversion catalyst for, e.g., cracking, hydrocracking, reforming, paraffin isomerization, aromatization, and alkylation. When the product is used as a catalyst, it is first calcined to remove the alkylammonium ion then it may be exchanged with cations from Groups I through VIII of the Periodic Table and ammonium replaces the excess sodium ions which may be undesirable. Cations generally may be removed by calcination at temperatures usually between 300° and 600° C. in an oxygen containing gas.

Such a calcined material is an excellent starting point for further dealumination of the said ECR-30, by a variety of chemical methods well known in the art, to further increase the Si/Al ratio of the hp form, even to the point of preparing a pure silica analogue of ECR-30.

In another embodiment of this invention, the novel aluminosilicate may be prepared by a process comprising:

(a) preparing a reaction mixture comprising an oxide of sodium, the alkyl ammonium salt, water, a source of silica, a source of alumina, and sodium aluminosilicate nucleating seeds, said reaction mixture having a composition, in terms of mole ratios of oxides, within the following ranges:

| | |
|---|---|
| $\frac{Na + T}{Na}$ | 3 to 5 |
| $(Na,T)_2O:Al_2O_3$ | 2 to 12 |
| $SiO_2:Al_2O_3$ | 14 to 50 |
| $H_2O:Al_2O_3$ | 150 to 600 | where T represents an alkyl ammonium cation of the type methyl triethyl, and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture at a temperature between about 70° C. and 160° C. under autogenous pressure for a sufficient period of time to form crystals of the aluminosilicate; and (d) recovering the aluminosilicate crystals.

It will be understood that the compositions herein may contain some waters of hydration (the x value above) which may be at least partially removed when the zeolites are employed as sorbents or catalysts.

DESCRIPTION OF THE PREFERRED EMBODIMENTS

Figure 1:
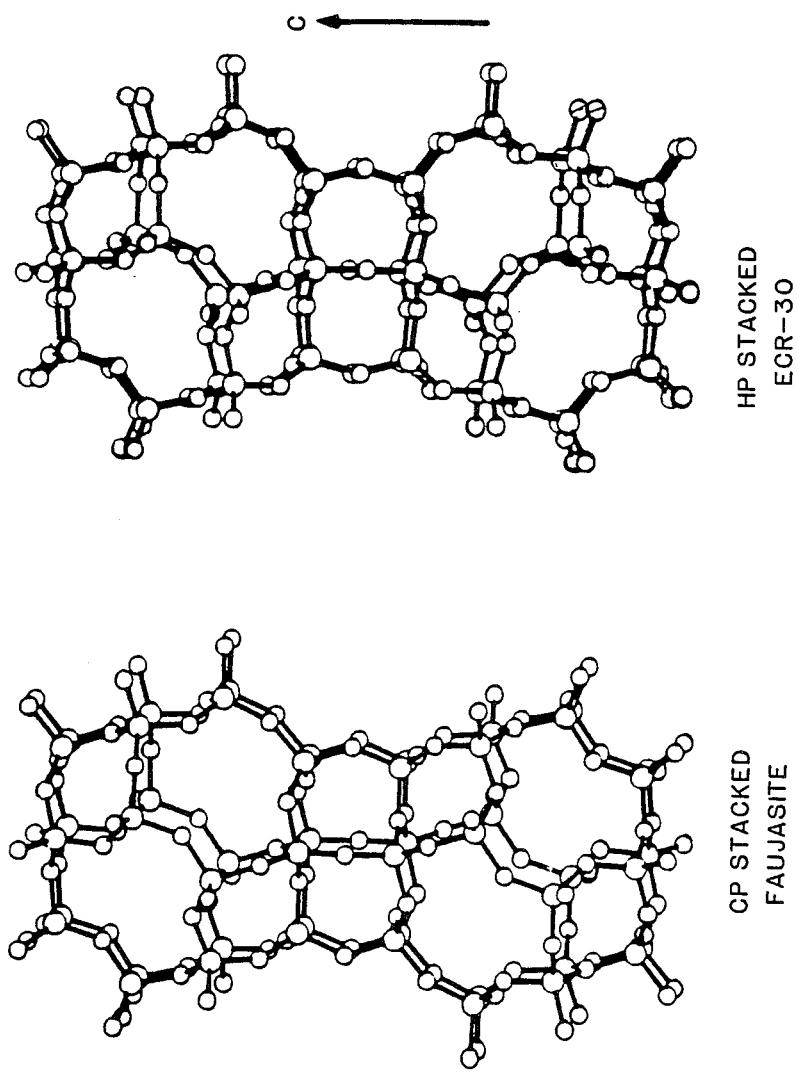
FIG. 1 shows a comparison of connectivity in cubic packed and hexagonal packed sodalite cages.

The aluminosilicate herein generally will have the formula, in terms of mole ratios of oxides, in the range: 0.2 to 0.8 $T_2O$:0.20 to 0.8 $Na_2O$:$Al_2O_3$:6 to 20 $SiO_2$:x-$H_2O$ or preferably 0.2 to 0.6 $T_2O$:0.20 to 0.8 $Na_2O$:$Al_2O_3$:6 to 15 $SiO_2$:$H_2O$, or most preferably 0.2 to 0.6 $T_2O$: 0.4 to 0.8 $Na_2O$: $Al_2O_3$:6 to 12 $SiO_2$, where x is 0–25 and T is a triethyl methyl ammonium group.

The methyl triethyl ammonium cations are relatively large ions which are not trapped within the sodalite cages of the aluminosilicate faujasite structure, but are present in the super cages of the structure.

Minor variations in the mole ratios of the oxides within the ranges given in the chemical formulas above do not substantially alter the structure or properties of the zeolite. In addition, the number of waters of hydration x in the formula will not be the same for each preparation and will depend mainly on the degree to which the aluminosilicate is dried, and the amount of template.

In order to convert the inventive high silica ECR-30 zeolites into catalysts, the organic ions in the "super cage" of the zeolite are first exchanged, desorbed or degraded by temperature. By comparison to other zeolites having alkyl ammonium ions trapped in their smaller cages, the temperature of calcination is significantly lower. As even large decomposition organic fragments may easily diffuse through the large pores of the zeolite ECR-30, bond breakage and lattice degradation usually associated with the escape of such fragments from the smaller cages at high temperature is not observed in ECR-30.

The exchangeable cations, which may partially or fully replace the sodium ions wherever they may be found, and the organic ammonium ions in the large cages of the ECR-30 structure, may be cations of metals from any one of Groups I through VIII of the Periodic Table including rare earth metals and ammonium, depending on the end use desired. Preferably, the cations will be mono-, di- and trivalent metal cations, particularly from Groups I, II or III of the Periodic Table, such as barium, calcium, cesium, lithium, magnesium, potassium, strontium, zinc, or the like, or hydrogen, rare earth metals, or ammonium. The presence of these exchangeable cations will generally not cause a substantial alteration of the basic crystal structure of the aluminosilicate. Any ion exchange technique may be employed such as those discussed, for example, in U.S. Pat. No. 3,216,789.

The aluminosilicate herein may be prepared by a process in which a reaction mixture, generally a slurry, is formed comprises of an oxide of sodium, water, the organic ammonium salt, a source of silica, a source of alumina, and sodium zeolitic (aluminosilicate) nucleating seeds. The oxide of sodium may be, e.g., sodium hydroxide, and the organic ammonium salt may be a sulfate, nitrate, hydroxide or halide salt, and is preferably a halide such as the chloride, iodide or bromide salt because of lower cost. The silica may be derived from sources such as, e.g., silica gels, silica acid, aqueous colloidal silica sols as described, for example, in U.S. Pat. No. 2,574,902, reactive amorphous solid silicas such as fume silicas and chemically precipitated silica sols, and potassium or sodium silicate. The pure silicas such as sols and gel are preferred. The alumina may be derived from sources such as, e.g., activated alumina, gamma alumina, alumina trihydrate, sodium aluminate, alum, kaolin, metakaolin or the like. It is noted that the sodium oxide may be provided not only directly by adding, e.g., sodium hyroxide to the mixture, but also indirectly from the source of silica and/or the source of alumina if, for example, sodium silicate and sodium aluminate (prepared by dissolving NaOH and $Al_2O_3.3$-$H_2O$ in water) are respectively employed as at least one of the silica and alumina sources. The preferred sources of alumina are the aluminates or an aluminum salt selected from the chloride, sulfate and nitrate salts.

The aluminosilicate nucleating seeds for the reaction mixture, also known as zeolitic nucleation centers, comprise of a slurry of zeolitic solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows: 4 to 30 $Na_2O$:1 to 9

Al$_2$O$_3$:3 to 30 SiO$_2$:250 to 2000 H$_2$O. Such slurries of nucleating seeds may be prepared by the process disclosed in U.S. Pat. Nos. 3,808,326 and 4,178,352, the disclosures of which are incorporated by reference. In general, the preparation procedure involves mixing of silica sol or gel, sodium aluminate and water together and aging the resulting slurry at about 0° to 90° C. for about 1 to 700 hours, with lower temperatures requiring a longer period of time. The seed slurry is aged at about 15° to 40° C. for about 20 to 400 hours and the zeolite nucleation centers have compositions in the range: 10 to 16 Na$_2$O:1 to 9 Al$_2$O$_3$:10 to 15 SiO$_2$:250 to 2000 H$_2$O.

The amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein will also serve as nucleation seeds.

The relative amounts of ingredients in the reaction mixture will be such that the mixture has a composition, in terms of mole ratios of oxides, within the following ranges:

| Oxide Constituents | Ranges of Mole Ratios |
| --- | --- |
| (Na,T)$_2$O:Al$_2$O$_3$ | 1.6 to 10 |
| SiO$_2$:Al$_2$O$_3$ | 14 to 50 |
| H$_2$O:Al$_2$O$_3$ | 150 to 600 | where T represents an organic ammonium group as described above. Preferably, the mole ratio of H$_2$O to Al$_2$O$_3$ in the reaction mixture ranges from 100 to 400, and the mole ratio of SiO$_2$ to Al$_2$O$_3$ from 20 to 46.

The order of mixing the ingredients is not essential, and all ingredients may be added simultaneously. In one preferred method of preparation, an aqueous silica sol solution, a slurry of nucleating seeds and an organic ammonium halide solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss. Experiments are run under autogenous pressure conditions.

After the reaction mixture is formed, it may be homogenized by thorough blending so as to be substantially homogeneous in texture. This step is to ensure that the aluminosilicate product ultimately obtained is not a mixture of products and thus impure. The mixing may take place in any vessel in which complete mixing, e.g., a blender.

The homogenized mixture is then placed in a reactor, ordinarily one which can withstand elevated pressures such as a tetrafluoroethylene-lined jar or an autoclave, where it is maintained at a temperature of between about 70° C. and 160° C., preferably 90° C. and 120° C., and, for commercial purposes, preferably no greater than 160° C. The exact temperature will determine at a given sodium oxide level the length of time employed for reaction. At temperatures of about 120° C., the zeolite ECR-30 is obtained in 3–5 days. When the homogenized mixture is heated, it is maintained at autogenous pressures which will depend on the temperature employed. At the higher temperatures, pressures of up to about 3 to 5 atm or higher may be achieved. The amount of time required for heating will depend mainly on the temperature employed, so that at 95° C. the heating may be carried out, e.g., for up to 70 days or more, whereas at, e.g., 120° C. or more the time period may be, e.g., 3 to 7 days. In any event, the heating is carried out until crystals are fully formed of the aluminosilicate zeolite product, i.e., ECR-30, having a the hp designated structure, a mole ratio of SiO$_2$/Al$_2$O$_3$ of at least four and the presence of organic ammonium templates removable below about 400° C. as shown by thermogravimetric analysis.

The crystallization time may be shortened, if desired, by seeding the slurry before or after the blending step with minor amounts of zeolite ECR-30 crystals of this invention which are preferably chopped at low temperatures and a size range less than about 0.05 before adding to the reaction slurry.

When the aluminosilicate crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step, the zeolite crystals may be dried then calcined.

Figure 2:
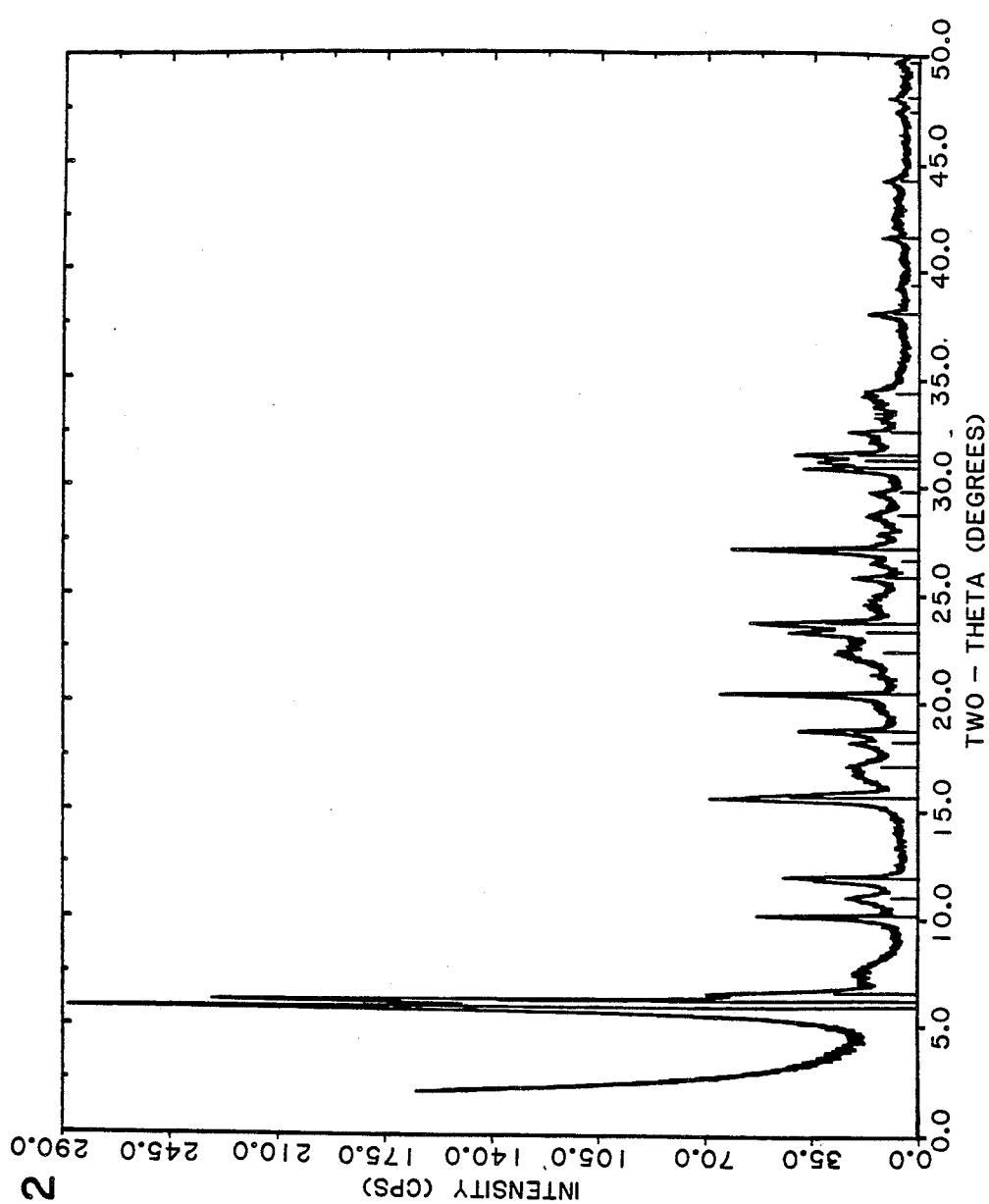
FIG. 2 shows x-ray diffraction pattern for Ex. 2 and is typical for ECR-30.
Figure 3:
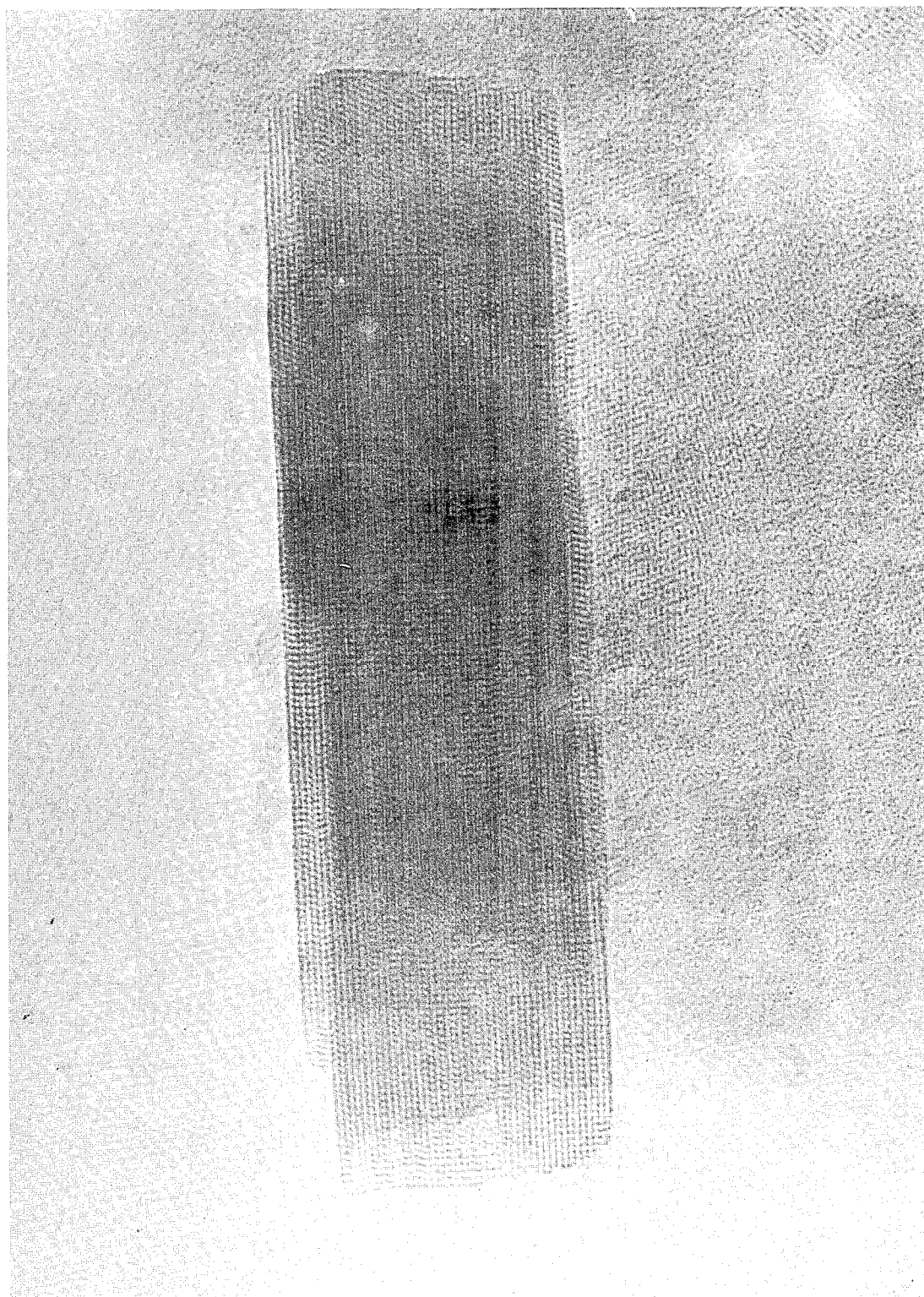
FIG. 3 shows an electron micrograph with the unique layer sequence of ECR-30.

The aluminosilicate ECR-30 of this invention may be used as a sorbent or as a catalyst, e.g., in a hydrocarbon conversion process such as in paraffin isomerization, aromatization, and alkylation and reforming, and in the hydrocracking and cracking of lube stocks, fuels and crude oils. To be employed for these applications, the aluminosilicate may be at least partially dehydrated by drying at temperatures of up to about 500° C. or more until most or all of the water of hydration is removed. ECR-30 is defined by a chemical composition and x-ray diffraction spectrum. The typical x-ray diffraction pattern in Table 2 and illustrated in FIG. 2 is the most important definitive characteristic, together with high resolution electron microscopy lattice images, which clearly show the predominance ABAB stacking of sheets of interconnected sodalite cages (FIG. 3).

TABLE 2

| dÅ | Relative Intensity |
| --- | --- |
| 15.00 ± 0.2 | V-S |
| 14.20 ± 0.2 | S |
| 13.40 ± 0.2 | M-W |
| 8.70 ± 0.2 | M |
| 8.03 ± 0.15 | M-W |
| 7.40 ± 0.15 | M |
| 5.65 ± 0.15 | M-S |
| 5.20 ± 0.10 | M-W |
| 4.70 ± 0.10 | W |
| 4.34 ± 0.10 | M |
| 3.97 ± 0.08 | M-W |
| 3.75 ± 0.08 | M-W |
| 3.28 ± 0.08 | M-W |
| 2.89 ± 0.05 | M-W |
| 2.86 ± 0.05 | M-W |
| 2.83 ± 0.05 | M-W |
| 2.60 ± 0.05 | W |

| dÅ | Relative Intensity |
|---|---|
| 2.36 ± 0.05 | W |

Strong (S)
Very Strong (V-S)
Medium Strong (M-S)
Medium (M)
Medium Weak (M-W)
Weak (W)

EXAMPLES

The following examples demonstrate the efficacy of the invention.

EXAMPLE 1

A seed composition of:

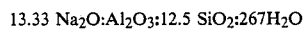

13.33 $Na_2O:Al_2O_3:12.5\ SiO_2:267H_2O$ was made of dissolving 12.02 g. of aluminum oxide trihydrate in a solution of 60 g. NaOH in 100 g. H₂O at 100° C. After complete dissolution of alumina, the solution was cooled to room temperature and added, with vigorous mixing, to a solution of 201.5 g. sodium silicate (P.Q. Corp., "N" brand) and 126.3 of H₂O. After homogenization, the solution was allowed to age at least 16 hours in a Teflon bottle prior to use as a nucleant slurry.

EXAMPLE 2

A slurry of stoichiometry:

6($E_3MN)_2O$: 1.8 $Na_2O:Al_2O_3:30SiO_2\ 350H_2O$ was made by mixing together 54.56 gm. colloidal silica sol (Dupont HS-40), 8.2 gms. of the seeds described in Example 1 (equivalent to 10% seeding), 50.5 gms 40% aqueous solution of the triethyl methyl ammonium hydroxide, 4.83 gms. sodium aluminate (made by dissolving 27.6 gm. NaOH in 35 gms. H₂O, adding 3.5 gms. $Al_2O_3\cdot 3H_2O$, heating to boiling until the solution is clear, then cooling to room temperature and adding water to a final weight of 121.5 gms.), 3.5 gms aluminum sulfate from a solution of 50 gm alum in solution, 59.6 gm alum, then adding water to a final weight of 125 gms. The product was heated in a Teflon (Dupont) bottle at 100° C. for 27 days, at which time it was cooled, filtered, washed with distilled water and dried at 115° C. X-ray diffraction analysis gave the pattern shown in Table 3 and FIG. 2. Chemical analysis by ICPES gave a product composition of 29.1 Si, 5.58 Al, 2.07 Na to yield an ECR-30 stoichiometry of:

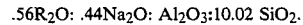

.56$R_2O$: .44$Na_2O$: $Al_2O_3$:10.02 $SiO_2$.

TABLE 3
X-RAY DIFFRACTION PATTERN FOR ECR-30 OF EXAMPLE 2

| 2 THETA | D | I/I$_o$ |
|---|---|---|
| 5.896 | 14.9761 | 100.0 |
| 6.214 | 14.2106 | 75.1 |
| 6.583 | 13.4156 | 5.1 |
| 10.181 | 8.6813 | 14.4 |
| 11.012 | 8.0278 | 4.9 |
| 11.905 | 7.4273 | 15.0 |
| 15.668 | 5.6512 | 29.5 |
| 17.111 | 5.1776 | 20.5 |
| 18.236 | 4.8607 | 2.0 |
| 18.742 | 4.7305 | 15.1 |
| 20.458 | 4.3374 | 16.2 |
| 22.361 | 3.9724 | 13.3 |
| 23.307 | 3.8132 | 4.0 |
| 23.718 | 3.7482 | 25.7 |
| 25.859 | 3.4425 | 4.7 |
| 26.650 | 3.3420 | 3.0 |
| 27.178 | 3.2783 | 15.1 |
| 28.752 | 3.1023 | 5.1 |
| 29.790 | 2.9965 | 3.3 |
| 30.903 | 2.8911 | 4.5 |
| 31.251 | 2.8597 | 16.6 |
| 31.522 | 2.8358 | 6.2 |
| 32.602 | 2.7442 | 5.5 |
| 34.408 | 2.6042 | 9.8 |
| 38.066 | 2.3619 | 4.5 |
| 39.370 | 2.2867 | 1.3 |
| 41.616 | 2.1683 | 2.1 |
| 44.296 | 2.0431 | 5.0 |
| 47.428 | 1.9153 | 1.5 |
| 48.086 | 1.8906 | 1.5 |
| 49.693 | 1.8331 | 1.2 |

EXAMPLE 3

A slurry stoichiometry of:

2.4($E_3MN)_2O$: 0.8$Na_2O$: $Al_2O_3$:15 $SiO_2$:185 $H_2O$ was made by homogenizing a mixture of 79.3 gms. colloidal silica (Dupont HS-40), 4.64 gm. seeds (Example 1), 57.2 gms. 40% triethylmethylammonium hydroxide ($E_3MN$) solution, 13 gms. sodium aluminate solution (25 gms. $Al_2O_3\cdot 3H_2O+30$ gm $H_2O+19.8$ gm NaOH), 11.7 gms aluminum sulfate solution (20 gms. $Al_2(SO_4)_3$ M$H_2O+28.3$ gms $H_2O$), then adding sufficient water to give a total weight of 160 gms. This was reacted in a Teflon bottle for 67 days to give an ECR-30 product showing a characteristic X-ray diffraction pattern, a chemical stoichiometry of:

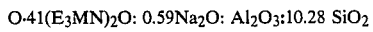

0.41($E_3MN)_2O$: 0.59$Na_2O$: $Al_2O_3$:10.28 $SiO_2$ (33.4% Si, 6.24% Al, 3.16% Na)

High resolution electron microscopy gave a characteristic product shown in FIG. 3, in which the lattice image clearly shows ABAB, stacking except for one single stack of ABC. This is clearly ECR-30 as defined as equivalent to hp stacked sodalite units.

EXAMPLE 4

A gel having the stoichiometry:

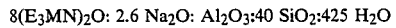

8($E_3MN)_2O$: 2.6 $Na_2O$: $Al_2O_3$:40 $SiO_2$:425 $H_2O$ was prepared by mixing the following components in a manner similar to that described in examples 2 and 3 6.12 gm seeds of EX. 1; 59.2 gm HS-40 colloidal silica (DuPont Co.), 1.43 gm C-31 alumina trihydrate (Alcoa Co); 1.13 gm NaOH; 54 gm 40% aqueous solution of triethyl methyl ammonium hydroxide and 3 gms H₂O. After homogenisation in a micro-blender, the gel was placed in a capped 25 ml Teflon bottle and placed in an air oven at 100° C. After 40 days the product was cooled, filtered on a vacuum filter, washed with distilled water and dried at 100° C. Chemical analysis gave a chemical composition of 5.47% Al, 27.4% Si, 2.01%

Figure 4:
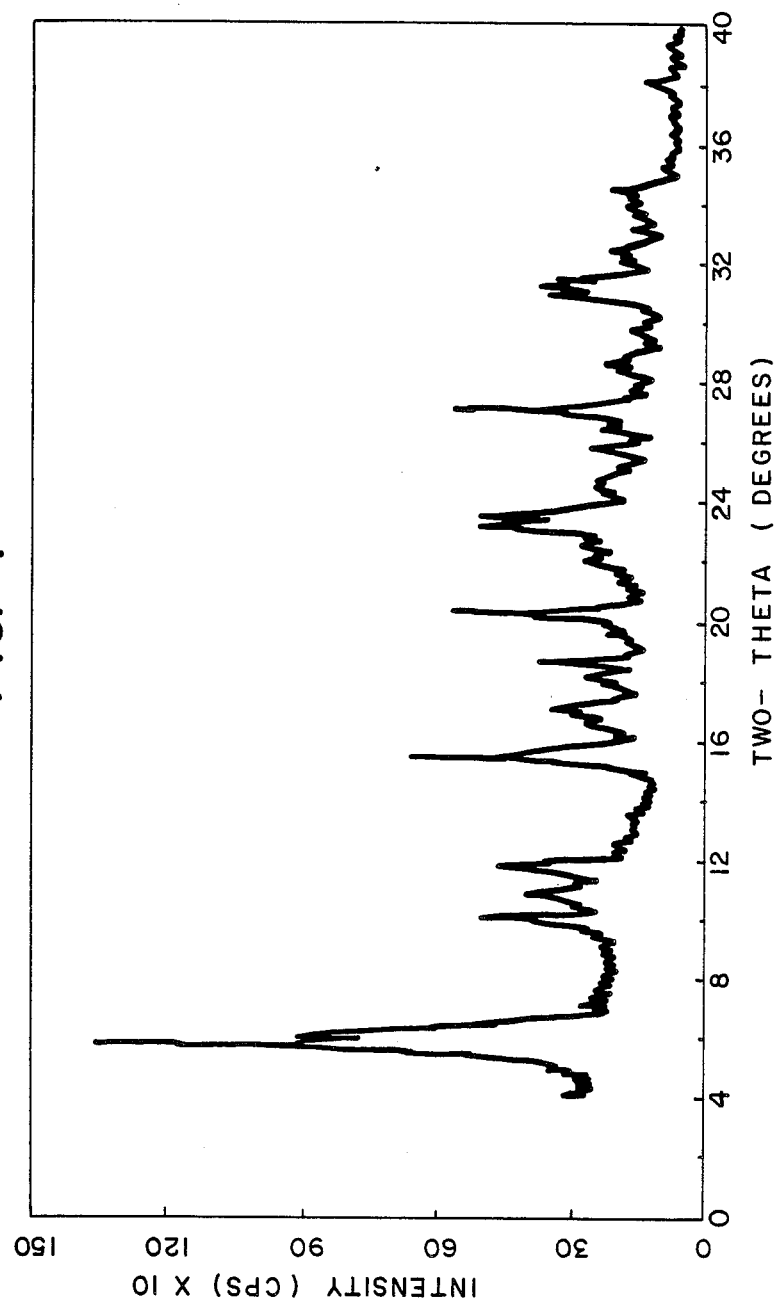
FIG. 4 shows x-ray diffraction pattern for Ex. 2 and is typical for ECR-30.

Na, representing an ECR-30 stoichiometry of 0.57 (E$_3$MN)$_2$O: 0.43 Na$_2$O: Al$_2$O$_3$:9.62 SiO$_2$. X-ray diffraction analysis gave the results shown in Table 4 and FIG. 4, and characteristic of ECR-30.

TABLE 4

| 2-THETA | dÅ | I/I$_o$ |
|---|---|---|
| 5.8786 | 15.0212 | 100.00 |
| 6.1787 | 14.2924 | 78.83 |
| 6.6188 | 13.3429 | 26.28 |
| 10.1595 | 8.6993 | 21.53 |
| 10.8396 | 8.1550 | 2.89 |
| 11.8798 | 7.4432 | 23.69 |
| 15.5801 | 5.6827 | 52.98 |
| 15.8802 | 5.5760 | 13.22 |
| 16.7202 | 5.2977 | 14.14 |
| 18.2003 | 4.8701 | 13.21 |
| 18.7203 | 4.7360 | 19.99 |
| 20.4603 | 4.3370 | 46.55 |
| 23.3002 | 3.8144 | 25.41 |
| 23.6602 | 3.7572 | 18.90 |
| 27.1599 | 3.2804 | 48.05 |
| 30.8995 | 2.8914 | 26.90 |
| 31.2194 | 2.8625 | 14.95 |
| 31.4794 | 2.8395 | 11.26 |
| 31.5994 | 2.8290 | 12.69 |

What is claimed is:

1. An aluminosilicate with a structure characterized by having an x-ray diffraction pattern similar to that shown in Table 2, a silica to alumina mole ratio of at least six, and containing methyl triethyl ammonium, wherein said organic ammonium template is within the super cages of said aluminosilicate, said zeolite having a hexagonal unit cell.

2. The aluminosilicate of claim 1 further characterized by having a composition, in terms of mole ratios of oxides, in the range:

0.2 to 0.8 T$_2$O:0.2 to 0.8 Na$_2$O:Al$_2$O$_3$:6 to 20 SiO$_2$:xH$_2$O wherein T represents said organic ammonium template and x represents 0 or an integer from 1 to 25.

3. The aluminosilicate of claim 1 further characterized by having a composition, in terms of mole ratios of oxides, in the range:

0.2 to 0.6 T$_2$O:0.4 to 0.8 Na$_2$O:Al$_2$O$_3$:6 to 12 SiO$_2$ wherein T is methyl triethyl ammonium ions.

4. A process for preparing the aluminosilicate of claim 1 which comprises:
 (a) preparing a reaction mixture comprising an oxide of sodium, a triethyl methyl ammonium salt, water, a source of silica, a source of alumina, and sodium aluminosilicate nucleating seeds, said reaction mixture having a composition, in terms of mole ratios of oxides, within the following ranges:

| | |
|---|---|
| (Na,T)$_2$O:Al$_2$O$_3$ | 2 to 12 |
| SiO$_2$:Al$_2$O$_3$ | 14 to 50 |
| H$_2$O:Al$_2$O$_3$ | 150 to 600 | wherein T represents the cation of the organic ammonium template, and said seeds being present in an amount to yield 0.1 to 10 mole percent of the total final alumina content in said aluminosilicate;
 (b) blending the reaction mixture sufficiently to form a substantially homogenous mixture;
 (c) maintaining the reaction mixture at between about 70° C. and 160° C. under autogenous pressure for a sufficient period of time to form crystals of said aluminosilicate; and
 (d) recovering said aluminosilicate crystals.

5. The process of claim 4 wherein the source of silica is a colloidal silica and the sources of alumina are hydrated alumina and an aluminum salt selected from the group consisting of the chloride, sulfate and nitrate salts.

6. The process of claim 4 wherein the reaction mixture is maintained between 90° C. and 120° C.

7. A composition of claim 2 further calcined to remove the organic component then exchanged with cations of groups 1 through 8 of the periodic table.

8. The process of claim 4 wherein the seeds are present in an amount to yield 1 to 10 mole percent of the total final alumina content.

9. A process of claim 4 in which the product comprises occasional irregular intergrowths of faujasite (cp) in the ECR-30 crystals.

* * * * *